United States Patent Office 3,268,402
Patented August 23, 1966

3,268,402
BLOOD ANTICOAGULANT AND VITAMIN C
ANTAGONIST RODENTICIDES
William M. Dillard, Ashland, Ohio, assignor to
Richardson-Merrell Inc., New York, N.Y., a corporation of Delaware
No Drawing. Filed Jan. 21, 1963, Ser. No. 252,584
10 Claims. (Cl. 167—46)

This invention relates to rodenticidal compositions of matter. In particular the invention relates to composition comprising a blood anticoagulant and a vitamin C antagonist which are effective in causing the death of rodents when consumed over a period of time.

Serious economic losses are caused by the depredation of various species of rodents. Rats and mice consume large amounts of grain and other foods and destroy or contaminate amounts many times greater than consumed. Rats are also known to kill and destroy young chickens, turkeys, and other species of poultry and damage valuable property of various kinds. Certain species of rodents are common hosts or vectors of diseases affecting man and animals. Great expenditures of time, effort, and money have been made in preventing or minimizing the destruction caused by the rodent population.

The most satisfactory rodenticide must be effective in producing death of the rodent pests, and possess a maximum degree of safety to man and other desirable species. The destruction of rodent pests, without simultaneously imposing a hazard to the health of man and other animals, has been extremely difficult.

In the past "single feeding" baits containing a very toxic, rapidly acting poison have been commonly used. The wide use of such poisonous substances has presented serious health hazards to man and other animals due to their extremely toxic effects. The acceptability of "single feeding" type baits has been found frequently to be unsatisfactory.

It is generally agreed that the rat possesses a highly developed sense of self-protection and preservation. Although the rat consumes large quantities of food, it is suspicious of unusual odors and tastes, and will usually reject poison baits unless the poison is relatively undetectable. This is especially true after symptoms of poisoning appear among rats of the colony. Rats affected by sublethal quantities of a poisoned bait will not usually continue feeding upon such baits and survival often results. Unaffected rats have the ability to associate symptoms of poisoning with available poison baits and will not subsequently consume them. For these reasons "single feeding" type rodenticidal baits have been less than satisfactory from the standpoint of rodenticidal efficacy, acceptability, and safety to man and other desirable species.

The development of "multiple feeding" type rodent poisons has provided some improvement in the methods of rodent control. In recent years increasing attention has been given to the use of the anticoagulant-type compounds as rodent poisons. Their relative freedom from odor or taste has afforded greater acceptability as a rodent bait. The relatively slow, cumulative action of the anticoagulant-type compounds usually produces symptoms of poisoning only after a period of time following their ingestion. This elapse of time allows practically all rats of the colony to feed upon the poison bait and consume lethal quantities before symptoms of poisoning appear. Rats consuming anticoagulant-type baits continue feeding until symptoms of poisoning are evident, or shortly before death occurs due to hemorrhages developing in the tissues and body cavities.

The anticoagulant-type dodent poisons such as 3-(α-acetonylbenzyl)-4-hydroxycoumarin (warfarin) and 2-pivalyl-1,3-indandione have an anticoagulant effect upon the blood and also tend to cause capillary fragility, as a result of which fatal hemorrhages develop. The present invention is based upon the discovery that vitamin C antagonists, when combined with an anticoagulant in the diet, result in depression of the vitamin C stored in the body of the rodent which produces a scurvy-like condition which is characterized by an increased permeability of the capillaries. The resulting increased toxic action of the anticoagulant rodenticide has been found to be directly related to the increase in permeability in the capillaries as a result of a deficiency of vitamin C.

The exceptionally rapid metabolism and relatively large body requirement of vitamin C in the rat markedly predisposes this animal to an induced deficiency of the vitamin. Scientific evidence indicates that the biological half-life of vitamin C averages only 2.9 days in the rat as contrasted with an average of 16 days in man. Although the rat has a relatively large reserve of vitamin C in terms of milligrams per kilogram of body weight, the utilization of the vitamin is very high being approximately three times that of the guinea pig and tweny times that of man. It is for this reason that the rodenticide of the present invention is highly toxic to rodents when consumed over a period of several days but is relatively safe for man and other animals.

The importance of vitamin C in combating physiological stress associated with disease, malnutrition, and adverse environmental factors is well established. The rat is known to live under a variety of conditions causing physiological stress, associated with the habits and environment of the species. The rat is commonly affected by pneumonia and other respiratory diseases. Adverse climatic conditions and malnutrition are other biological stress factors which are commonly encountered by the rat. The antagonism of vitamin C in the rat, in accordance with the present invention, results in a deficiency of the vitamin and greatly limits the capacity of the rat to overcome these states of physiological stress. Since the ingestion of an anticoagulant in toxic amounts also imposes a severe physiological stress upon the rat, simultaneously induced deficiency of vitamin C, caused by the ingestion of the vitamin C antagonist, greatly reduces the capacity of the rat to overcome the ill effects of the anticoagulant.

As will be seen from the foregoing, the addition of a vitamin C antagonist to the diet of the rat increases the effectiveness of the anticoagulant by a dual action making it more effective as a rodenticide. This increased effectiveness makes it possible to reduce the level of the anticoagulant in the bait and thereby increases the margin of safety when consumed by economically desirable warm-blooded animals who usually have an adequate reserve of vitamin C because of their ability to synthesize the vitamin or because of their low daily requirements.

In a preliminary experiment groups of mice were fed continuously a food-grade corn meal containing varying amounts of D-glucoascorbic acid and varying amounts of the vitamin C antagonist with toxic amounts of warfarin. The mortality of the mice was recorded daily. Mice fed diets containing 0.25 percent of D-glucoascorbic acid suffered no mortalities during the fifteen days of the test but those fed a diet containing 0.25 percent D-glucoascorbic acid and 0.025 percent warfarin died earlier than those having the diet containing the 0.025 percent warfarin alone.

In another series of experiments, young male albino white rats were fed over a period of eight days on a basal diet of Rockland Rat Mash. To the diet of one group of twenty rats was added 0.5 percent of D-glucoascorbic acid, the diet of another group 0.0125 per cent warfarin, and a third group of twenty rats was fed 0.0125 percent warfarin and 0.5 percent D-glucoascorbic acid feed. In this series of experiments none of the rats having the diet containing only D-glucoascorbic acid died. On the other hand, three rats fed the diet of warfarin and D-glucoascorbic acid were dead after three days whereas only one of the rats on the warfarin diet had died; at the end of the test period, two of the rats on the warfarin diet were still alive but all of those on the anticoagulant-vitamin C antagonist diet had died. The average consumption of food in the warfarin and the warfarin-D-glucoascorbic acid groups was substantially the same indicating that the D-glucoascorbic acid did not adversely affect the rate at which the diet was consumed.

Despite the fact that both mice and rats suffered an earlier mortality when both anticoagulant and vitamin C antagonist were incorporated in their diet, symptoms and lesions of poisoning caused by the combination were less severe than those caused by the anticoagulant alone. Necropsy examination showed only very limited evidence of hemorrhage in the tissues. This observation substantiates the belief that the rodents on the combination diet were under a greater physiological stress due to the depletion of vitamin C in their bodies and died partly because of this condition.

In another series of observations, groups of ten rats were fed diets containing 0.003 percent of warfarin and other groups of rats were fed a combination of 0.003 percent warfarin with each of three different vitamin C antagonists. The rats were fed on alternate days with a diet free of warfarin and vitamin C antagonists. The results are shown in the following table.

Diet:  Days to 100% Mortality
0.25% γ-Galactonolactone, 0.003% warfarin __ 7
0.25% D-glucoascorbic acid, 0.003% warfarin __ 10
0.25% α-Glucoheptonolactone,
 0.003% warfarin _____ 8
0.003% warfarin _____ 17
0.25% γ-Galactonolactone, no deaths.
0.25% D-glucoascorbic acid, no deaths.

As clearly demonstrated in the above table, the diets containing the anticoagulant and vitamin C antagonist were more effective than those containing the anticoagulant alone even though the vitamin C antagonist had no noticeable effect.

In still another series of observations, ten individually fed rats were fed Rockland Rat Diet. The diet fed to one group of rats contained 0.003 percent of 2-pivalyl-1,3-indandione (Pival) whereas the diet of the other group contained, in addition, 0.25 percent of γ-galactonolactone as the vitamin C antagonist. Although 0.003 percent is a very low dosage level of the anticoagulant, 20 percent of the mice were dead in twenty-eight days whereas in the group fed a diet containing the anticoagulant and vitamin C antagonist, 40 percent of the mice were dead in twenty-eight days.

Any of the available anticoagulants effective in warmblooded animals may be employed in practicing the present invention. The preferred anticoagulant, warfarin, is described in United States Patent 2,427,578. Other 3-substituted-4-hydroxy cumarin anticoagulants described therein may also be used in practicing the invention. Other cumarin derivatives such as bis-hydroxycumarin, ethyl bis-coumacetate, cyclocumarol, and phenprocoumon may also be used. Similarly, anticoagulants of the indandione type such as 2-pivalyl-1,3-indandione, 2-(p-anisyl) indandione (United States Patent 2,899,358) may be used. Still other anticoagulants such as heparin, 1-phenyl-3-pyrazolidone, and diphenadione are also suitable for use in preparing rodenticides in accordance with the present invention. These anticoagulants are effective in the diet at very low levels. Preferred ranges appear to be 0.001 percent to 0.005 percent by weight but lower ranges down to 0.0005 percent by weight may be effective under some conditions. Higher concentrations of these anticoagulants, particularly in the case of those having weaker anticoagulant activity may also be used.

Several available vitamin C antagonists may also be used in practicing the present invention. These include D-glucoascorbic acid, α-glucoheptolactone, and γ-galactonolactone. These are used in the rodenticide of the present invention at levels of 0.1 percent or more. The preferred range appears to be 0.25 to 1.25 percent by weight.

From the foregoing, it will be seen that the invention comprises a rodent bait, or diet, containing at least 0.0005 percent by weight of a blood anticoagulant and at least 0.1 percent by weight of a vitamin C antagonist. It will be appreciated, of course, that the baits may be prepared in concentrated form and diluted by mixing with grain or other edible materials which rodents consume. Such concentrated premixes may contain up to about 10 percent by weight of the vitamin C antagonist and as much as 0.125 percent by weight of the anticoagulant.

In using the new rodenticides of the present invention, the bait is prepared by mixing the anticoagulant and vitamin C antagonist with cereals or other available food which rodents particularly enjoy and placing it in containers near places where the rodents live, eat, drink, gnaw, or run. The container should be put next to walls or fences and not in the open. The material should be protected from children, domestic animals, and the weather. The rodenticide should be inspected frequently, and if it becomes molded or spoiled, it should be replaced with fresh bait. In most cases the rodenticide becomes effective in a couple of weeks after it is made available to the eating rodent.

What is claimed is:

1. A composition of matter effective as a rodenticide which comprises effective amounts of a blood anticoagulant and a vitamin C antagonist.

2. A composition of matter effective as a rodenticide which comprises at least 0.005 percent by weight of a blood anticoagulant and 0.1 percent by weight of a vitamin C antagonist associated with an edible carrier.

3. A composition of matter effective as a rodenticide which comprises at least 0.0005 percent by weight of warfarin and 0.1 percent by weight of a vitamin C antagonist in an edible carrier.

4. A composition of matter effective as a rodenticide which comprises at least 0.0005 percent by weight of 2-pivalyl-1,3-indandione and 0.1 percent by weight of a vitamin C antagonist in an edible carrier.

5. A composition of matter effective as a rodenticide which comprises at least 0.0005 percent by weight of warfarin and 0.1 percent by weight of D-glucoascorbic acid in an edible carrier.

6. A composition of matter effective as a rodenticide which comprises at least 0.0005 percent by weight of warfarin and 0.1 percent by weight of α-glucoheptonolactone in an edible carrier.

7. A composition of matter effective as a rodenticide which comprises at least 0.0005 percent by weight of warfarin and 0.1 percent by weight of γ-galactonolactone in an edible carrier.

8. A method of controlling rodent population which comprises making available to rodents in areas inhabited by rodents a composition of matter comprising an edible material containing at least 0.0005 percent by weight of an anticoagulant and 0.1 percent by weight of a vitamin C antagonist.

9. A method of controlling rodent population which comprises making available to rodents in area inhabited by rodents a composition of matter comprising an edible material containing at least 0.0005 percent by weight of warfarin and 0.1 percent by weight of D-glucoascorbic acid.

10. A method of controlling rodent population which comprises making available to rodents in areas inhabited by rodents a composition of matter comprising an edible material containing at least 0.0005 percent by weight of 2-pivalyl-1,3-indandione and 0.1 percent by weight of D-glucoascorbic acid.

References Cited by the Examiner

UNITED STATES PATENTS

| 2,687,365 | 8/1954 | Link | 167—46 |
| 2,880,132 | 3/1959 | Schwarcz | 167—46 |

OTHER REFERENCES

Annals of the New York Academy of Sciences, vol. 92, Art. 1, pages 6–20, 36–56, 87–114, 128–140 and 295–306.

Engelkes, Lancet, vol. 229, page 1285 (1935), 167–81C.

Jenkins et al., The Chemistry of Organic Medicinal Products, (1957), published by John Wiley and Sons, Inc., New York, pages 177–179.

Woolley, A Study of Antimetabolites, published by John Wiley and Sons, Inc., New York (1952), pages 37–40.

JULIAN S. LEVITT, *Primary Examiner.*

LEWIS GOTTS, *Examiner.*

D. B. MOYER, VERA C. CLARKE, *Assistant Examiners.*